United States Patent [19]
Johnson

[11] Patent Number: 5,906,445
[45] Date of Patent: May 25, 1999

[54] APPARATUS APPLYING A LIQUID TO A LAWN

[76] Inventor: Richard D. Johnson, R.D. 1, Box 57, Grand Valley, Pa. 16420

[21] Appl. No.: 09/032,000

[22] Filed: Feb. 27, 1998

[51] Int. Cl.$^6$ ................................................. B03C 1/08
[52] U.S. Cl. ......................... 401/48; 239/155; 239/754; 401/208
[58] Field of Search ................... 401/48, 208; 47/1.7; 15/24; 222/414; 239/156, 155, 754, 244

[56] References Cited

U.S. PATENT DOCUMENTS

| | | | |
|---|---|---|---|
| 826,897 | 7/1906 | Shely | 401/48 |
| 1,739,587 | 12/1929 | Greenberg | 366/237 X |
| 2,273,599 | 2/1942 | Smith et al. | 401/48 X |
| 2,696,696 | 12/1954 | Tigerman | 47/1.01 R |
| 3,152,353 | 10/1964 | Cravener | 401/208 X |
| 3,255,929 | 6/1966 | De Haan | 222/613 |
| 3,408,149 | 10/1968 | Lakes | 401/147 |
| 3,560,102 | 2/1971 | Wetzel | 401/218 |
| 3,831,848 | 8/1974 | Cook | 239/754 X |
| 3,990,800 | 11/1976 | Graff | 401/48 X |
| 4,015,907 | 4/1977 | Lodge | 401/48 |
| 4,222,678 | 9/1980 | Miller | 401/208 X |

FOREIGN PATENT DOCUMENTS

| | | | |
|---|---|---|---|
| 50461 | 7/1935 | Denmark | 366/237 |

*Primary Examiner*—Henry J. Recla
*Assistant Examiner*—Kathleen J. Prunner
*Attorney, Agent, or Firm*—Antonelli, Terry, Stout & Kraus, LLP

[57] ABSTRACT

An apparatus may be forcibly moved over an underlying grassy surface, such as a lawn, to evenly apply a liquid treatment material by contact between the outer surface of a support roller contacting the ground. Above the roller is provided a pivotally supported, internal segmented liquid-distribution element from which treatment liquid may flow via a plurality of spouts onto the outer surface of the roller. Liquid is provided to the liquid distribution element, by a plurality of flexible tubes communicating with a liquid container positioned above. A mechanism driven by the roller generates an up-and-down reciprocating motion of a slidably guided element loosely engaging the liquid-distribution element to give it a back-and-forth pivoting motion. Liquid being delivered from the container to the underlying ground surface is thus first sloshed inside the liquid distribution element. This ensures that any undissolved components of the liquid treatment materials are enabled to dissolve, and settlement of dirt and debris which may tend to clog flow apertures of the liquid distribution element is prevented.

15 Claims, 2 Drawing Sheets

APPARATUS APPLYING A LIQUID TO A LAWN

FIELD OF THE INVENTION

This invention relates to an apparatus applying a liquid substance to a surface such as a lawn for treatment thereof, and more particularly to apparatus which may be conveniently towed behind a riding lawn motor or the like to evenly apply a liquid chemical agent such as fertilizer, insecticide, or selective herbicide.

BACKGROUND OF THE RELATED ART

Treatment of small grassy areas, e.g., to apply fertilizer, insecticide, or selected herbicide to inhibit weeds, can be accomplished with the use of conventional sprayers or sprinklers. However, when relatively large expanses of lawn must be treated, e.g., around large public buildings, in parks, near airport runways, or on golf courses, considerations of efficiency, and economy require that the applied material be put in intimate contact with the grass and/or weeds quickly, evenly, and with minimum wastage of time or treatment material. Examples of previous attempts to solve this problem are discussed below.

U.S. Pat. No. 826,897, to Shely discusses an applicator in which a distributing tube is used to dispense a liquid from small openings therein. An interior sleeve of the tube is rotated to control the dispensing of the liquid.

U.S. Pat. No. 2,696,696, titled "Applicator for Weed-Killing Liquid", to Tigerman, discusses a manually-pushed applicator in which the liquid is gravity fed from a container to a distribution tube lying above and parallel to a roller contacting the underlying ground surface. The distribution tube is provided with three rows of outlets which are angularly equally spaced about the circumference of the tube.

U.S. Pat. No. 3,152,353, titled "Lawn Application for Fertilizer and the Like", to Cravener, discusses a generally similar device comprising a liquid container and an elongate distribution tube provided with a plurality of bottom orifices positioned over an underlying ground-contacting roller. The device is provided with a control valve between the liquid container and the distribution tube.

U.S. Pat. No. 3,255,929, titled "Herbicide Applicator", to de Haan, discusses a generally comparable device in which the roller is provided with an absorbent sleeve-like cover.

U.S. Pat. No. 3,408,149, titled "Liquid Applicator", to Lakes, discusses a device in which a chain-drive from a roller is utilized to pressurize a liquid container from which liquid is provided via a plurality of flexible connected tubes to a corresponding plurality of cooperating tubular elements spaced apart, above and parallel to the roller for flow of pressurized liquid downward to the roller. This device is also provided with a connector element for connection to a towing apparatus such as a riding lawn motor.

Finally, U.S. Pat. No. 3,560,102, titled "Liquid Herbicide Applicator", to Wetzel, discusses a manually-pushable applicator in which liquid from a container is gravity fed to an elongate distribution tube provided with a plurality of apertures and is covered with an absorbent sleeve and flap via which the liquid is distributed to an outer surface of an absorbent covering on the underlying roller.

As is obvious from the above-described known devices, provision of the liquid material via a plurality of orifices is known. However, the known devices do not apply the liquid material efficiently and evenly, especially over hilly terrain.

In particular, the position of the distributing tube remains fixed relative to the frame of the device. If pushed or pulled along a slope such that the tube is tilted, the liquid will collect in the lower end of the tube resulting in uneven application.

Also, for fertilizers, herbicides, and insecticides which are produced and provided to users in powdered, granular or crystalline form and not directly as liquid compositions, it is likely that there will be partially-dissolved solid material during application which might clog the relatively small orifices through which the solution is intended to be dripped to the roller. Also, the liquid residue in the orificed distribution element may dry out and the solid/crystalline remnant may clog the distribution orifices. The result may be that the intended even distribution of the treatment material is not subsequently realized.

There has also become an awareness that liquid chemical agents are damaging to the environment when there is an application of excessive material resulting in run off into streams, ponds and rivers. Although the chemicals may be safe when properly applied, the uneven application of presently known devices causes the user to over apply the chemical agents in an attempt to compensate for any strips of grassy area left untreated. Consequently, the defects of the known prior art do not merely result in the poor application of the chemical agent; they also cause substantial damage to the environment when the total number of golf courses, lawns, etc. treated with the chemical agents are considered in the aggregate.

The present invention is intended to address the above-described problems with a simple, durable, inexpensive and easily maintained structure. The invention can be readily adapted to sizes ranging from simple manually-pushed structures to larger structures readily towable by riding lawn motors, tractors, or the like for treatment of very large areas of lawn.

SUMMARY OF THE INVENTION

Accordingly, it is a principal object of this invention to provide an apparatus with which a user may efficiently, quickly and reliably apply a liquid material to an underlying surface such as a lawn having grass and/or weeds that are to be treated.

It is also an object to provide an application which prevents excessive waste and application of liquid chemical agents, thereby damaging the environment.

It is a related object of this invention to provide an apparatus which enables a user to evenly apply a liquid chemical agent, such as a solution of powder or crystals in a solvent over an area, e.g., underlying lawn, of hilly terrain.

These and other related objects of this invention are realized by providing an apparatus for applying a liquid to an underlying surface, which comprises a framework and a liquid container mounted thereto. The apparatus includes a roller which is rotatably fitted to the framework to support the same on the underlying surface, e.g., a lawn wherein grass and/or weeds are to be treated by the liquid. A liquid distribution element having a plurality of outflow apertures is pivotally supported to the framework above the roller, and is connected via a plurality of flow connection elements to the liquid container. The liquid distribution element is internally compartmentalized so that it constitutes a plurality of mutually separated portions. Also provided is a mechanism by which rotation of the roller on the lawn provides a rotary input converted into a reciprocating output for pivoting the liquid distribution element so as to shake and distribute the liquid via the outflow apertures onto an outer surface of the roller for improved solution and even distribution thereby over the underlying surface as the roller rotates thereon.

In one aspect of this invention, the mechanism for providing reciprocation of the liquid distribution element includes an axial crank fitted to the roller, with a link engaged to the crank and to a reciprocating element driven by the link to cause the liquid distribution element to pivot relative to the framework.

In another aspect of this invention, the mechanism for producing pivoting movement of the liquid distribution element comprises a first gear fitted to the roller, a second gear engaging with the first gear and fitted with a link, and a reciprocating element driven by the link to cause the liquid element to pivot.

Another aspect of the invention is that liquid from the container is distributed to a plurality of mutually separated segments or portions of the liquid distribution element for distribution through a plurality of apertures while the liquid distribution element is pivoted in a back-and-forth manner by elements driven by the roller as the apparatus is moved over an underlying surface.

DETAILED DESCRIPTION OF THE PREFERRED EMBODIMENTS

Figure 1:
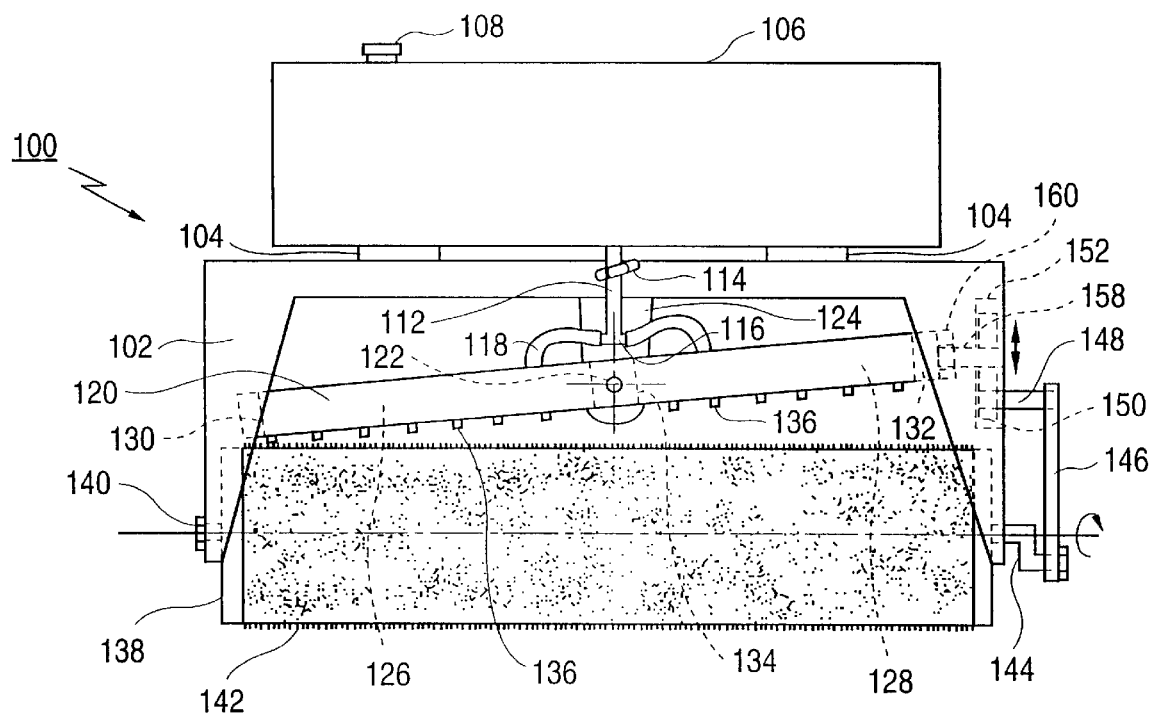
FIG. 1 is a front elevation view of a first embodiment of the apparatus of this invention, wherein a back-and-forth rocking or pivoting movement of a liquid distribution element is obtained by way of a link element connected to a ground-contacting roller.

As best seen in FIG. 1, in the apparatus 100 according to the first embodiment there is provided a framework 102 which may be conveniently manufactured from sheet metal in any known manner, providing support for one or more container-mounting elements 104,104 above which is mounted a liquid container 106 having a filler opening closeable by a cap 108. Container 106 contains a treatment liquid, the meniscus of which will move as the apparatus is pushed or pulled to traverse uneven positions of the underlying ground or lawn which is being treated.

To facilitate gravity-driven outflow of the liquid from container 106, there is provided a liquid outflow pipe 112 communicating with the bottom of container 106. As best seen in FIG. 1, a manually-operated flow valve 114 is provided, by which a user may adjust or shut off liquid flow from the container 106. Liquid outflow pipe 112 ends in an inverted T-shaped fitting 116. In the alternative, a fitting having more than two outlet branches (not shown) may be substituted instead. To each branch of the T-shaped or multi-branched outlet of liquid outflow pipe 112 is fitted a respective flexible tube 118, which at an opposite end is fitted to and communicates with an interior of a pivotable elongate liquid distribution element 120. Liquid distribution element 120, in the first embodiment per FIG. 1, is pivotally mounted at a pivot 122 supported by a pivot-mounting bracket 124 preferably depending downwardly from an upper portion of framework 102. This is best seen in FIG. 1.

Liquid distribution element 120 has a generally elongate cylindrical form, and has an interior subdivided into mutually separated compartments 126 and 128 by the use of inserted plugs such as end plugs 130 and 132 and one or more internal plugs 134.

Plugs 130, 132, 134 may be made of any suitable material, e.g., vulcanized rubber, plastic, metal, or the like. The exact material chosen is not critical so long as it is durable and compatible with the type of liquid with which the plugs may make extended contact. Note that while only one internal plug 134 is illustrated in FIG. 1, this is not intended to be limiting, i.e., more than one internal plug may be employed to generate more than two internal compartments given two end plugs such as 130 and 132. As will be readily understood by persons of ordinary skill in the art, if more than two compartments are provided there must be respective flexible tubes such as 118 to each of them from the common single liquid outflow pipe 112.

The bottom of liquid distribution element 120 is formed to have a plurality of small through-apertures (not shown for simplicity) through which liquid may flow out under the influence of gravity via respective external spouts 136. The provision of such short spouts, which may be made of any suitable material such as plastic or metal, insures against clogging from the outside of the through apertures by dirt, wet grass clippings, and the like.

Framework 102 is formed to have two downwardly depending portions which cooperatively provide rotational support for a ground-contacting roller 138 below and essentially parallel to the liquid distribution element 120. The roller may be securely mounted to the framework by suitable bearings and retainer elements 140 in such a manner that it may be readily detached for maintenance purposes. Roller 138 is preferably provided with a closely fitting, porous liquid-absorbent sleeve 142 made of a durable material capable of prolonged contact with treatment liquids and able to withstand repeated hard contact with underlying ground during use. Numerous suitable materials are known and may be selected by persons of ordinary skill in the art to suit particular needs.

The exact choice of sleeve material, dimensions and liquid absorbance, are all considered matters of design choice and details thereof are not considered critical.

It is important that the liquid dispensing spouts 136 be provided in a suitable number relative to the overall length of absorbent sleeve 142 and roller 138. The gravity-assisted delivery of liquid through the spouts 136 should cause uniform wetting of the absorbent sleeve 142 for even delivery thereby of the liquid to underlying blades of grass, weeds, and other material constituting the support surface contacted by roller 138 and absorbent sleeve 142.

Figure 2:
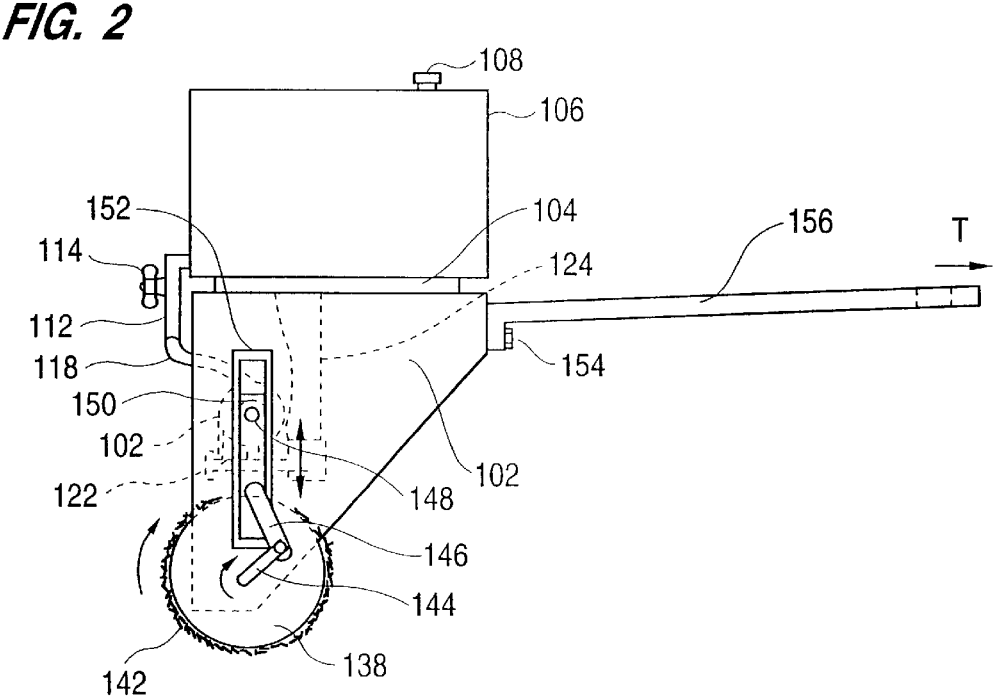
FIG. 2 is a side elevation view of the first embodiment per FIG. 1.

As best seen with reference to FIGS. 1 and 2, in the first embodiment, roller 138 is provided at one side with a simple crank element 144 which rotates with the roller. The "throw" or effective crank radius of crank element 144 is a matter of design choice, to be selected with consideration given of the overall size of the apparatus. It may vary between relatively small structures suitable for manual pushing by a single user and mechanically-towed larger structures in which roller 138 may have dimensions of many feet in length and diameter, e.g., for use on golf courses, parks, and the like. Details of materials and dimensions are considered matters of design choice and are not critical to the success of the present invention for its intended purpose.

Crank element 144 is coupled to an elongate link element 146, at the upper end of which is provided a short pin-like element 148 which engages with a slidable element 150 slidably supported in a slide guide 152 mounted to the framework 102.

As best seen in FIG. 2, to an upper front portion of framework 102, by one or more bolts 154, may be mounted a bar 156 to which may be applied a towing force, indicated by arrow labeled "T", by a riding lawn mower, small tractor, or the like. Alternatively, the bar 156 may be used as a push bar and may have a somewhat different form as deemed as most convenient for use by a person manually pushing the apparatus. The details of the exact form chosen for tow-bar (or push-bar) 156 to satisfy ergonomic needs is considered a manner of design choice and is not critical to the success of the invention for its intended purpose.

As persons of ordinary skill in the art will appreciate from the above description and reference to FIGS. 1 and 2, when the apparatus is moved, friction between the ground surface and porous covering 142 of roller 138 will cause the roller to rotate. This will cause rotation of crank element 144 and, via link 146, will cause slidable element 150 to reciprocate up and down while being slidably guided by slide guide 152. Reciprocating element 150 is provided with an inwardly extending pin 158 a distal end of which conveniently extends into the nearest end open of pivotally supported liquid distribution element 120. This is readily accomplished by inward location of end plug 132 and/or by making that end of liquid distribution element 120 project longitudinally a little more than the opposite end thereof. In other words, suitable dimensioning in known manner can easily provide an end opening of the liquid distribution element 120 to loosely receive therein the distal end of pin 158 which reciprocates up and down as the apparatus is towed or pushed over a lawn surface.

The exact dimension of end opening 160, like the other dimensions, is a matter of design choice. It is important, however, that the distal end of pin 158 should not bind forcibly with the end recess 160 of liquid distribution element 120. A little looseness of fit here is necessary since dirt, grass clippings, and the like may occasionally get caught therein. Any such debris which incidentally locates there will very soon be moved out by the relative loose-fitting engagement between pin 158 and the liquid distribution element 120.

As the apparatus is moved over the lawn, rotation of roller 138 via crank 144 generates an up and down motion of pin 158 which causes back-and-forth pivoting motion of liquid distribution element 120 about pivot support 122. This is especially important over hilly terrain since the pivoted movement of the element will enable the liquid to be evenly distributed from the spouts 136.

Another result is that any liquid contained within compartments 126 and 128 in the interior of liquid distribution element 120 will experience at least an alternating back-and-forth longitudinal acceleration. If there are any undissolved particles of treatment material or incidental dirt in the liquid, these will be moved around repeatedly. Undissolved matter will thus be enabled to dissolve in the liquid, and any dirt particles will be frequently disturbed so that they do not settle into and block any of the outflow orifices corresponding to liquid delivery spouts 136. This causes enhanced solution of dissolvable components in the solvent component of the treatment liquid and active interference with any tendency of dirt particles to settle into and clog or block the orifices through which liquid is to be delivered via spouts 136. Furthermore, if the apparatus is left standing on a hot day, if the liquid distribution chamber is perfectly horizontal at rest, all the liquid therein will drip out through the apertures therein. If it is not perfectly horizontal, the liquid will tend to flow within the compartments 126 and 128 toward the lowest corners thereof. Any evaporation of the solvent portion of the treatment liquid will leave any precipitated matter only in a small corner portion of each compartment, i.e., not over any of the apertures. During subsequent use of the apparatus, additional liquid which enters compartments 126 and 128, due to the deliberately generated sloshing action, will soon dissolve previously dried and precipitated material and thus will prevent clogging of the apertures communicating with the spouts 136.

Figure 3:
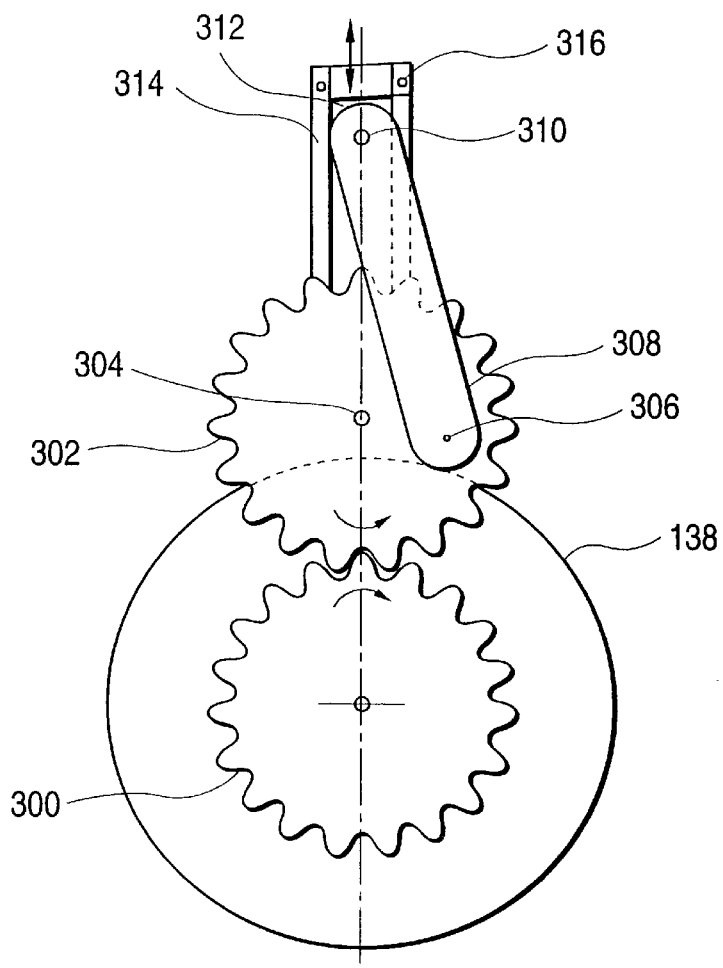
FIG. 3 is an elevation view of an alternative mechanism for generating a back-and-forth pivoting movement of a liquid distribution element according to a second embodiment of this invention.

FIG. 3 is a partial, simplified elevation view of key elements according to a second embodiment of this invention. The other cooperating elements are the same as those of the first embodiment. In this second embodiment, roller 138 is fitted with a first gear 300 which has teeth engaging with the teeth of a second gear 302 rotatably mounted to framework 102 at a pivot 304. Second gear 302, via link pivot 306, pivotally connects to an elongate link 308 which serves the same purpose as link 146 in the first embodiment per FIGS. 1 and 2. Link 308, via pin 310 causes an up-and-down reciprocating motion of a reciprocating element 312 slidably guided within slide guide 314 mounted to framework 102 by rivets, spot-welds, or the like 316. Reciprocating element 312 has the same general structure and performs the same function as reciprocating element 150 in the first embodiment. Persons of ordinary skill in the art can be readily expected to appreciate and understand this, hence further details are not deemed necessary.

It should be understood that reciprocating element 312 has an inwardly projecting pin, like pin 158 of the first embodiment, which engages with the immediately adjacent end portion of the pivotally supported liquid distribution element 120.

To summarize: in the second embodiment per FIG. 3, movement of the apparatus over an underlying ground surface will cause rotation of engaged gears 300 and 302 and, via link 308, will generate a corresponding back-and-forth pivoting motion of liquid distribution element 120 to obtain the same advantageous results as described above with reference to the first embodiment. By suitable choice of the gear ratio between gears 300 and 302, one can obtain a frequency ratio different from the one-to-one ratio provided by the crank 144 between roller rotation and pivoting of liquid-distribution element 120 in the first embodiment.

Figure 4:
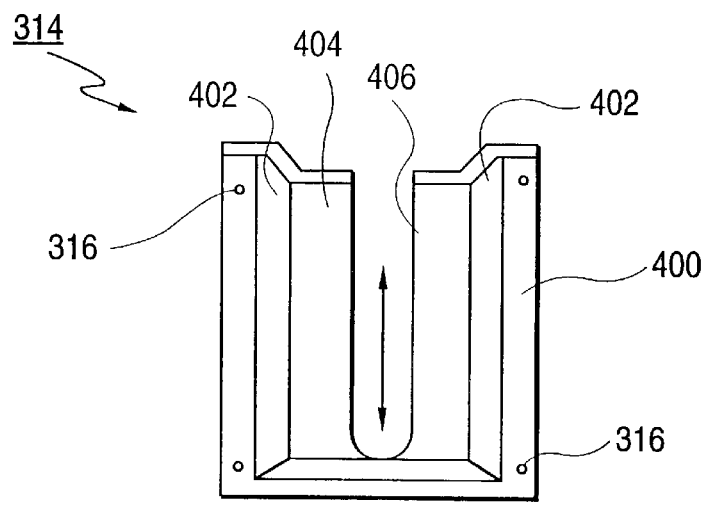
FIG. 4 is a front perspective view of a slide guide element for supporting a reciprocating element in either the first or second embodiments per FIGS. 1 and 3.

FIG. 4 is a front perspective view of slide guide 314 which is for all practical purposes structurally the same as slide guide 152 of the first embodiment. Note, in particular, that rivets, spot-welds or the like 316 may be provided in outer flange portions 400 of slide guide 314. Parallel opposite vertical guide surfaces 402,402 of slide guide 314 may be lubricated, and cooperatively provide sliding guidance to reciprocating element 312 (or 150) disposed therebetween. The back internal face 404 is preferably provided with a central vertical slot 406 through which pin 158 extends inwardly toward the immediately adjacent open end of pivotally supported liquid distribution element 120 as described earlier.

Persons of ordinary skill in the art will immediately realize that the above-described crank mechanism of the first embodiment and the geared mechanism of the second embodiment are merely exemplary, and that well-known substitutes may be employed instead. Such substitutes may include but need not be limited to cam-and-rod, spring-and-tension line, and other combinations of elements capable of converting the rotating motion of roller 138 to a reciprocating input for producing the back-and-forth rocking and pivoting motion of liquid distribution element 120. All such obvious and/or known variations of the fundamental concept described herein are considered to be comprehended within the scope of the present invention. In other words, any means for converting the rotating motion of roller 138 into the desired back-and-forth motion of liquid distribution element 120 is considered to be equivalent to and capable of generating the same desired end result as described herein with particular reference to the first and second embodiments. The scope of the present invention, therefore, is considered to be limited solely by the terms of the claims appended below.

What is claimed is:

1. An apparatus for applying a liquid to an underlying surface, comprising:

a framework;

a liquid container mounted to the framework;

a roller rotatably fitted to the framework to support the framework on the underlying surface;

a liquid distribution element having a plurality of outflow apertures and pivotably supported to the framework above the roller about an axis substantially perpendicular to gravity;

a plurality of flow connection elements connecting the liquid container to the liquid distribution element to convey liquid thereto; and a mechanism for pivoting the liquid distribution element about said axis to distribute said liquid via the outflow apertures onto an outer surface of the roller for distribution thereby over the underlying surface as the roller rotates.

2. The apparatus according to claim 1, further comprising:

a connector element by which the apparatus, supported by the roller on the underlying surface, may be towed.

3. The apparatus according to claim 1, wherein:

the roller comprises a porous external sleeve.

4. The apparatus according to claim 3, wherein:

the outflow apertures are provided with respective liquid-delivery spout elements; and the mechanism for producing pivoting of the liquid distribution element comprises an axial crank fitted to the roller, a link engaged to the crank, and a reciprocating element driven by the link.

5. The apparatus according to claim 4, further comprising:

a liquid flow control valve for adjusting a flow of liquid from the liquid container to the liquid distribution element; and a slide guide mounted to the framework, with the reciprocating element slidably mounted within the slide guide and engaged to the link to be reciprocated thereby; and a pin element mounted to the reciprocating element and engaged to the liquid distribution element to reciprocate an end thereof.

6. The apparatus according to claim 5, further comprising:

a connector element by which the apparatus, supported by the roller on the underlying surface, may be towed.

7. The apparatus according to claim 3, wherein:

the outflow apertures are provided with respective liquid-delivery spout elements; and the mechanism for producing pivoting of the liquid distribution element comprises a first gear wheel rotatable with the roller, a second gear wheel rotatably engaged with the first gear wheel, a link pivotably connected to the second gear wheel, and a reciprocating element driven by the link.

8. The apparatus according to claim 7, further comprising:

a liquid flow control valve for adjusting a flow of liquid from the liquid container to the liquid distribution element;

a slide guide mounted to the framework, with the reciprocating element slidably mounted within the slide guide and engaged to the link to be reciprocated thereby; and a pin element mounted to the reciprocating element and engaged to the liquid distribution element to reciprocate an end thereof.

9. The apparatus according to claim 8, further comprising:

a connector element by which the apparatus, supported by the roller on the underlying surface, may be towed.

10. The apparatus to claim 1, wherein:

the outflow apertures are provided with respective liquid-delivery spout elements.

11. The apparatus according to claim 1, further comprising:

a plurality of mutually separated portions in the liquid distribution element corresponding to said plurality of flow connection elements; and a liquid flow control valve for adjusting a flow of liquid from the liquid container to the mutually separated portions in the liquid distribution element via the plurality of flow connection elements.

12. The apparatus according to claim 1, wherein:

the mechanism for producing pivoting of the liquid distribution element comprises an axial crank fitted to the roller, a link engaged to the crank, and a reciprocating element driven by the link.

13. The apparatus according to claim 12, further comprising:

a slide guide mounted to the framework, with the reciprocating element slidably mounted within the slide guide and engaged to the link to be reciprocated thereby; and a pin element mounted to the reciprocating element and engaged to the liquid distribution element to reciprocate an end thereof.

14. The apparatus according to claim 1, wherein:

the mechanism for producing pivoting of the liquid distribution element comprises a first gear wheel rotatable with the roller, a second gear wheel rotatably engaged with the first gear wheel, a link pivotably connected to the second gear wheel, and a reciprocating element driven by the link.

15. The apparatus according to claim 14, further comprising:

a slide guide mounted to the framework, with the reciprocating element slidably mounted within the slide guide and engaged to the link to be reciprocated thereby; and a pin element mounted to the reciprocating element and engaged to the liquid distribution element to reciprocate an end thereof.

* * * * *